US006757103B2

(12) United States Patent
Shirasuna

(10) Patent No.: US 6,757,103 B2
(45) Date of Patent: Jun. 29, 2004

(54) ZOOM LENS AND OPTICAL EQUIPMENT USING THE SAME

(75) Inventor: Takashi Shirasuna, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/836,372

(22) Filed: Apr. 18, 2001

(65) Prior Publication Data

US 2001/0055157 A1 Dec. 27, 2001

(30) Foreign Application Priority Data

Apr. 20, 2000 (JP) ......................................... 2000/119739

(51) Int. Cl.$^7$ .......................... G02B 27/44; G02B 15/14
(52) U.S. Cl. ......................... 359/565; 359/570; 359/686
(58) Field of Search ................................ 359/686, 565, 359/569, 570

(56) References Cited

U.S. PATENT DOCUMENTS

| | | | |
|---|---|---|---|
| 5,044,706 A | 9/1991 | Chen | 359/357 |
| 5,268,790 A | 12/1993 | Chen | 359/558 |
| 5,790,321 A | 8/1998 | Goto | 359/742 |
| 5,815,320 A | 9/1998 | Hoshi et al. | 359/686 |
| 5,978,153 A * | 11/1999 | Nishio | 359/570 |
| 5,978,158 A * | 11/1999 | Nagata | 359/753 |
| 5,978,159 A * | 11/1999 | Kamo | 359/793 |
| 6,002,519 A * | 12/1999 | Hayashi et al. | 359/554 |
| 6,002,529 A | 12/1999 | Kohno et al. | 359/686 |
| 6,078,433 A * | 6/2000 | Hasenauer et al. | 359/691 |
| 6,094,313 A * | 7/2000 | Yamanashi | 359/676 |
| 6,094,314 A * | 7/2000 | Tanaka | 359/689 |
| 6,157,494 A * | 12/2000 | Nagata | 359/683 |
| 6,236,515 B1 * | 5/2001 | Yamamoto et al. | 359/684 |
| 6,437,922 B2 * | 8/2002 | Enomoto et al. | 359/685 |
| 6,480,341 B2 * | 11/2002 | Ohtake | 359/686 |

FOREIGN PATENT DOCUMENTS

| | | |
|---|---|---|
| EP | 0 913 718 A2 * | 5/1999 |
| JP | 4-213421 | 8/1992 |
| JP | 6-234262 | 8/1994 |
| JP | 6-250088 | 9/1994 |
| JP | 6-260088 | 9/1994 |
| JP | 6-265788 | 9/1994 |
| JP | 06-324262 A * | 11/1994 |

* cited by examiner

Primary Examiner—John Juba, Jr.
(74) Attorney, Agent, or Firm—Fitzpatrick, Cella, Harper & Scinto

(57) ABSTRACT

A zoom lens includes a first lens unit having a positive optical power, a second lens unit having a negative optical power, a third lens unit having a positive optical power, and a fourth lens unit having a negative optical power in sequence from an object side. The zoom lens executes zooming by moving all the four lens units on an optical axis. At least one of the four lens units has at least one diffractive optical surface. By this arrangement, the size of the zoom lens can be easily reduced while securing a desired variable power ratio and correcting lateral chromatic aberration that is varied by zooming.

31 Claims, 10 Drawing Sheets

Fno.=3.87

SPHERICAL ABERRATION

ω = 31.57°

ASTIGMATISM

ω = 31.57°

DISTORTION (%)

ω = 31.57°

LATERAL CHROMATIC ABERRATION

Fno.= 8.28

SPHERICAL ABERRATION

ω = 11.69°

ASTIGMATISM

ω = 11.69°

DISTORTION (%)

ω = 11.69°

LATERAL CHROMATIC ABERRATION

FIG. 4
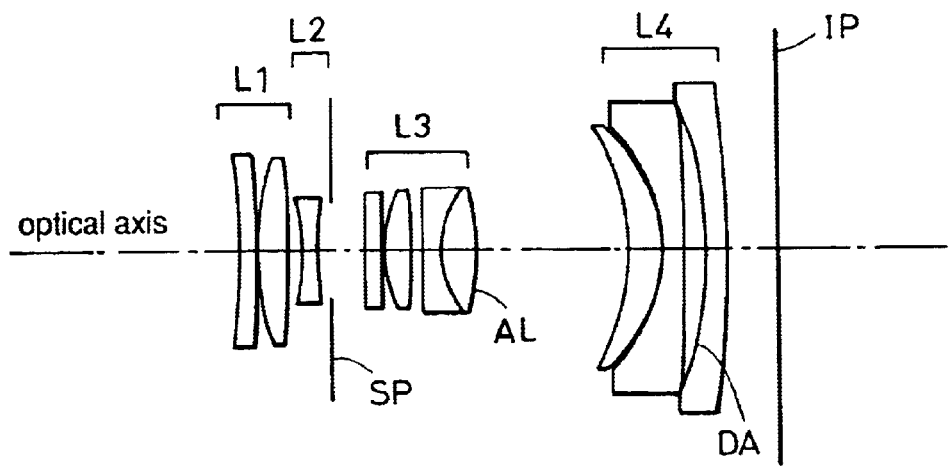
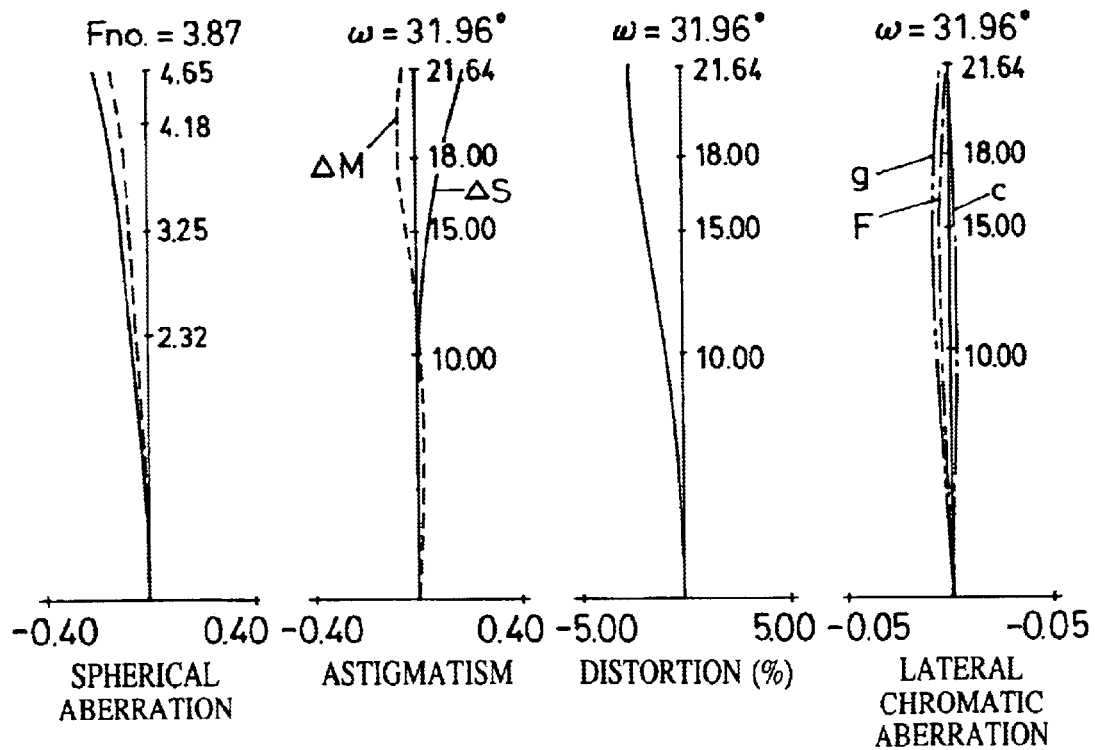

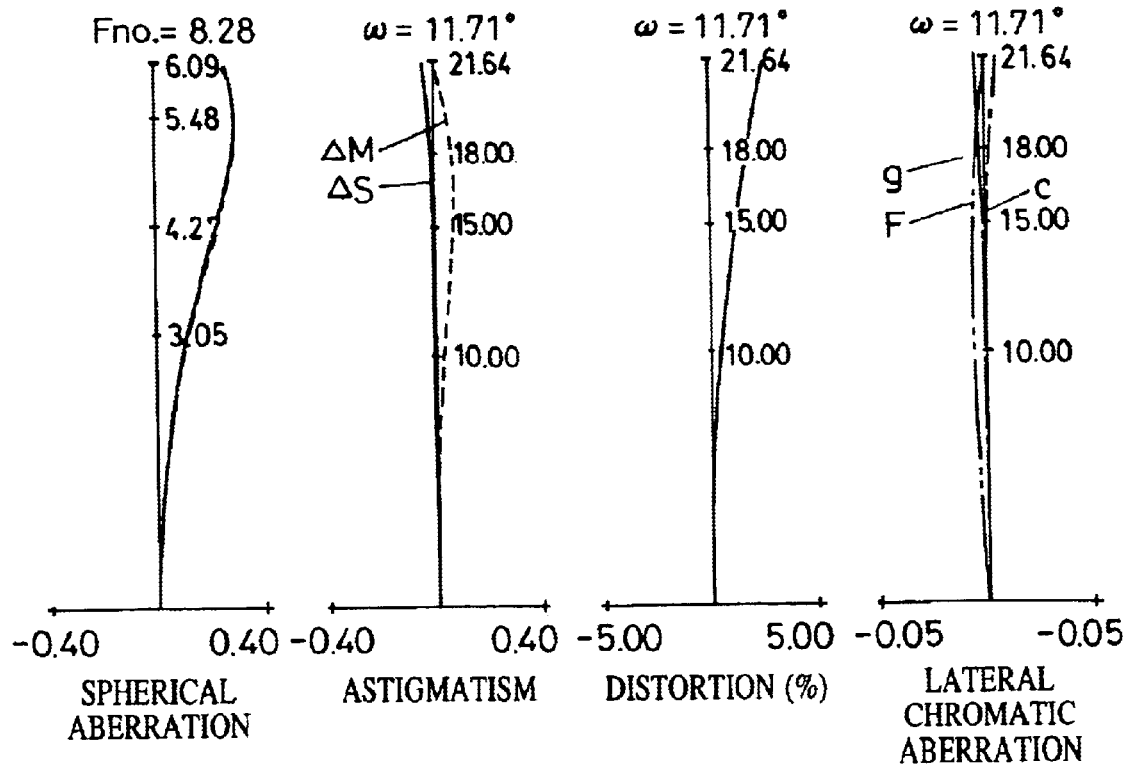

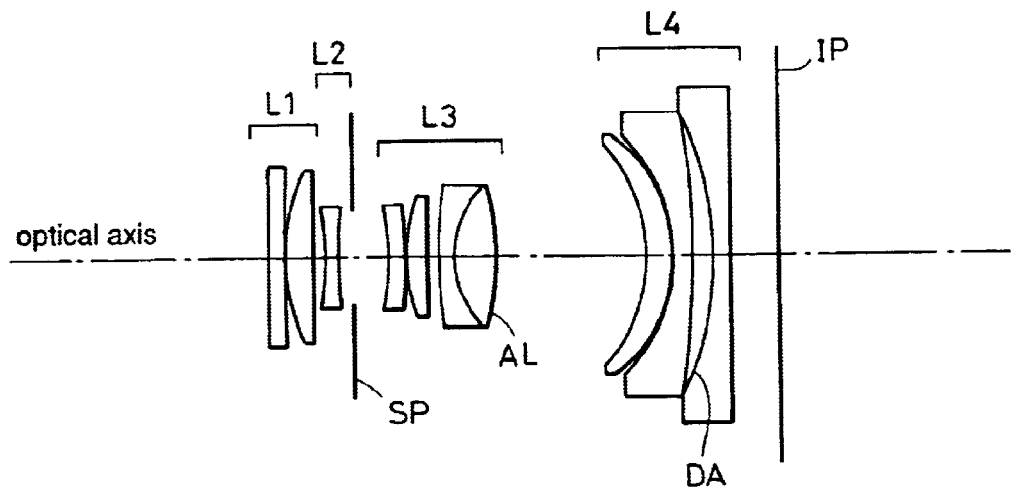
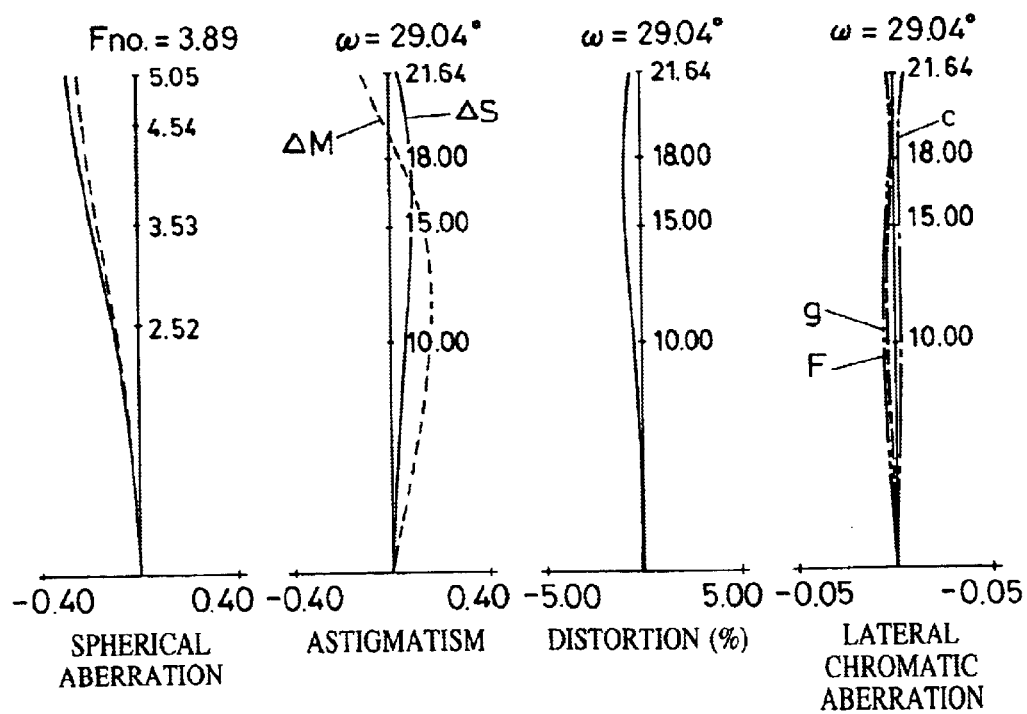

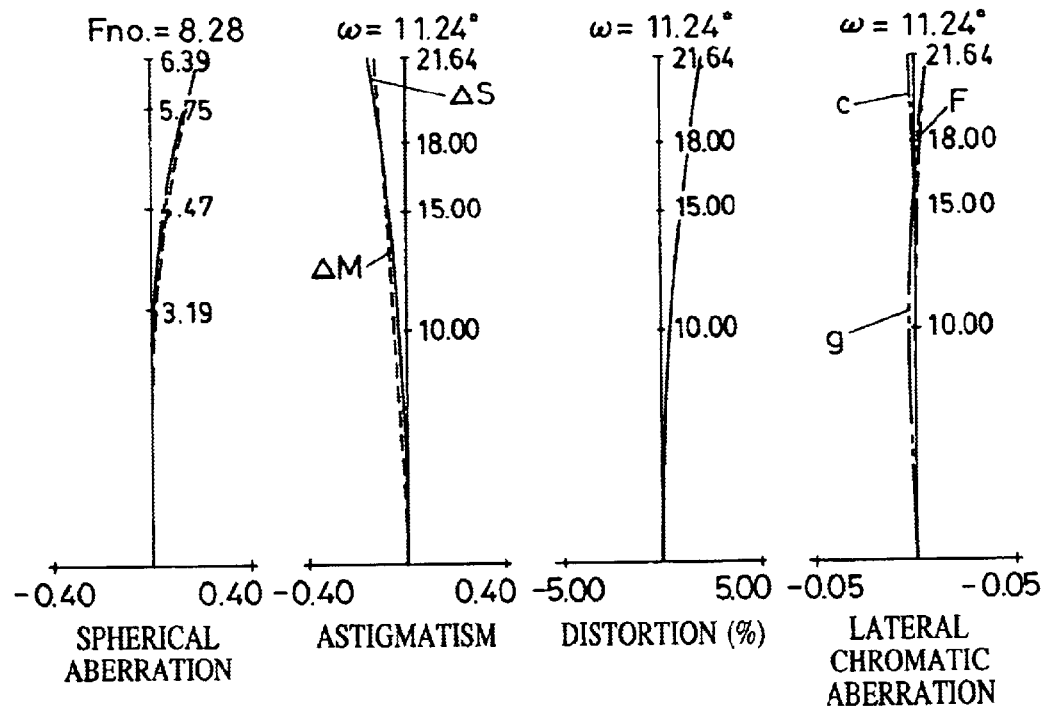
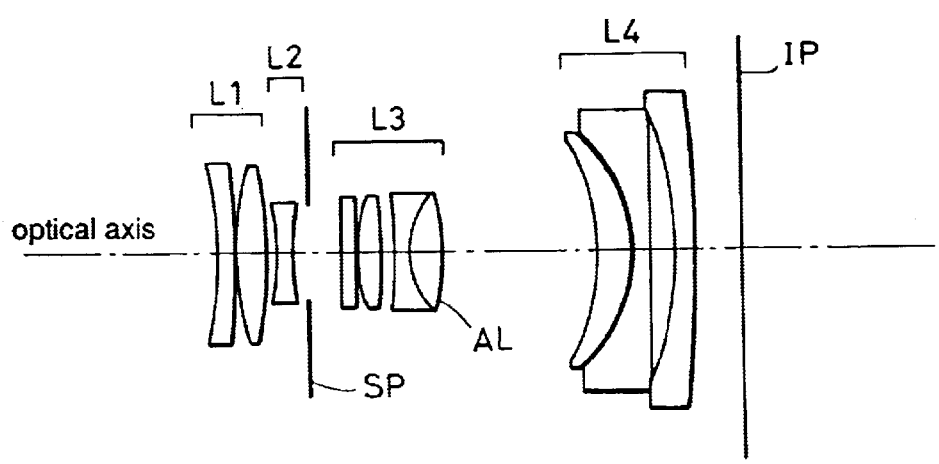

FIG. 11A
Fno.=3.87
SPHERICAL ABERRATION
FIG. 11B
ω=31.76°
ASTIGMATISM
FIG. 11C
ω=31.76°
DISTORTION (%)
FIG. 11D
ω=31.76°
LATERAL CHROMATIC ABERRATION
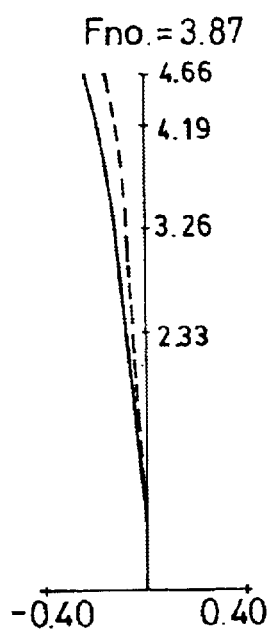
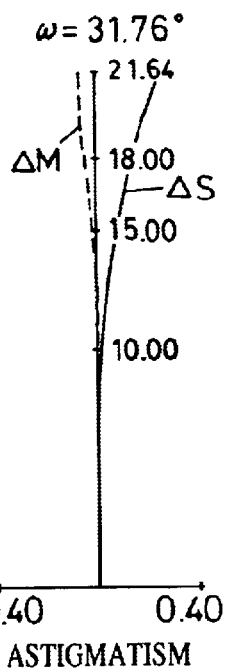
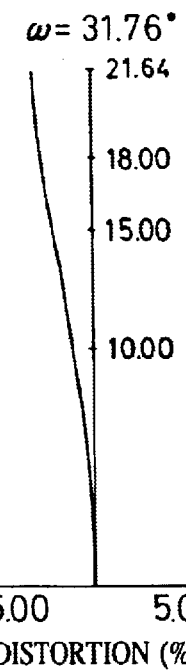
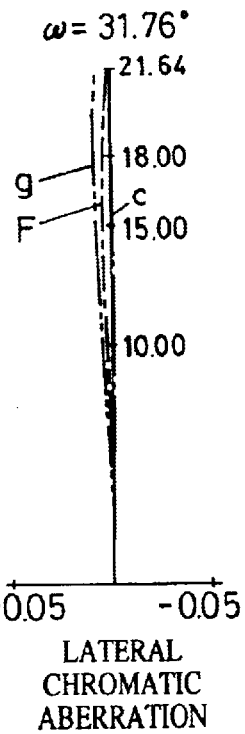
FIG. 12A
Fno=8.28
SPHERICAL ABERRATION
FIG. 12B
ω=11.68°
ASTIGMATISM
FIG. 12C
ω=11.68°
DISTORTION (%)
FIG. 12D
ω=11.68°
LATERAL CHROMATIC ABERRATION
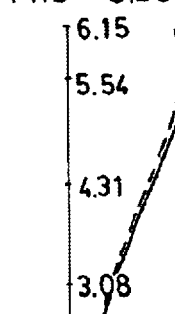
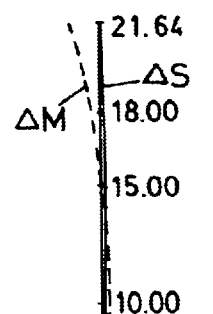
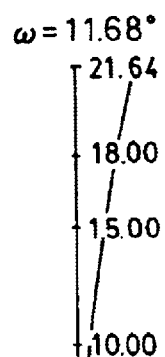
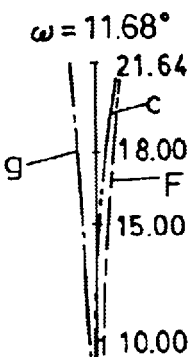

ZOOM LENS AND OPTICAL EQUIPMENT USING THE SAME

BACKGROUND OF THE INVENTION

1. Field of the Invention

The present invention relates to a zoom lens and optical equipment, and more particularly, to a zoom lens that favorably corrects the various aberrations of an optical system, in particular, the lateral chromatic aberration thereof by effectively using a diffractive optical element (diffractive optical surface), the zoom lens being suitably applied to optical equipment such as a lens shutter camera, a video camera, a digital camera, and the like.

2. Description of the Related Art

Recently, as the size of optical equipment such as a lens shutter camera, a video camera, and the like is reduced, a compact zoom lens having a high variable power ratio and a short overall lens length is desired as an imaging lens used in such optical equipment.

A so-called positive lead-type zoom lens, in which a lens unit having a positive optical power is the lens unit closest to the object, is employed in many cases as a means for reducing the size of an imaging lens. A remarkable feature of this type of imaging lens is that the length of the back focus can be reduced, which is effective for use in a lens shutter camera and the like that require no space behind a lens system to dispose a quick return mirror as used in a single-lens reflex camera.

Recent optical equipment employs a zoom type imaging lens composed of three or four lens units to cope with an additional requirement for a high variable power ratio, in addition to the requirement for reducing the size of the imaging lens.

Japanese Patent Laid-Open No. 06-250088, for example, proposes a zoom lens composed of four lens units which sequentially have positive, negative (or positive), positive, and negative optical powers from an object as a zoom lens composed of four lens units to simultaneously realize both a reduction in size of an optical system and the improvement of optical performance.

This proposal introduces a compact zoom lens the overall size of which is reduced by reducing the diameter of a front lens and which is excellent in optical performance by arranging a third lens unit as a focusing lens unit.

Similarly, Japanese Patent Laid-Open No. 06-265788 (corresponding to U.S. Pat. No. 6,002,529) proposes a zoom lens composed of four lens units having positive, negative, positive, and negative optical powers from an object.

The proposal introduces a simply constructed zoom lens having a high optical performance, which achieves these characteristics by regulating the shift amount of respective lens units in zooming and properly disposing aspherical surfaces.

As disclosed in the invention of Japanese Patent Laid-Open No. 06-265788, recently, various types of aberration can be relatively easily corrected by a smaller number of lenses due to advances in the technologies for making and designing an aspherical surface, which permits an imaging lens, which is small in size and excellent in an optical performance, to be obtained.

In the various types of aberration, however, chromatic aberration must be ordinarily corrected by the chromatic dispersion characteristics of a glass material constituting lenses and the combination of positive lenses and negative lenses. Thus, the correction of the chromatic aberration by an aspherical surface cannot be much expected.

Recently, a technology has been developed that corrects the chromatic aberration by a diffractive optical surface of a diffractive optical element disposed to a lens surface or a part of an optical system. For example, Japanese Patent Laid-Open No. 4-213421 (corresponding to U.S. Pat. No. 5,044,706), Japanese Patent Laid-Open No. 6-324262 (corresponding to U.S. Pat. No. 5,790,321), U.S. Pat. No. 5,268,790, and the like propose this technology.

Of these proposals, U.S. Pat. No. 5,268,790 proposes a zoom lens composed of four lens units having positive, negative, positive, and negative optical powers. In the zoom lens, which executes zooming by moving second and third lens units, diffractive optical elements are used in the second lens unit used for zooming and in the third lens unit for correcting variations of an image surface caused by the zooming.

In general, to increase a variable power while reducing the size of a zoom lens, there is a method of, for example, increasing the optical power of the respective lens units as well as increasing the amount of movement of the respective lens units used for a variable power.

However, a simple increase in the optical power of the lens units and in the amount of movement of the respective lens units increases variations in aberration, in particular, variations in chromatic aberration that are caused by the zooming. Thus, it is difficult to obtain an excellent optical performance over an entire variable power range.

While Japanese Patent Laid-Open Nos. 4-213421 and 6-324262 propose correcting chromatic aberration by the application of the diffractive optical element, they do not specifically describe a method of removing variations in chromatic aberration caused by the zooming characteristic to a zoom lens.

Further, the zoom lens disclosed in U.S. Pat. No. 5,268,790 performs zooming by moving the second and third lens units. Thus, it is difficult for the zoom lens to increase the variable power ratio while avoiding an increase in the size thereof. Furthermore, since the diffractive optical element is used in the second lens unit acting as a main zoom lens unit, chromatic aberration is multiplied or varied in zooming by the movement of the second lens unit acting as the zoom lens unit, and thus chromatic aberration cannot be effectively corrected.

SUMMARY OF THE INVENTION

Accordingly, it is at least one object of the present invention to provide a zoom lens and optical equipment using the zoom lens, wherein the zoom lens can obtain a desired variable power ratio, the size of which can be easily reduced, and which can favorably correct lateral chromatic aberration varied by zooming and has excellent optical performance over the entire variable power range by properly constructing the lenses of respective lens units and properly setting diffractive optical surfaces to be disposed on the lens units.

To achieve the above purpose, the zoom lens of the present invention comprises in sequence from an object side a first lens unit having a positive optical power, a second lens unit having a negative optical power, a third lens unit having a positive optical power, and a fourth lens unit having a negative optical power, wherein the zoom lens executes zooming by moving all of the first, second, third, and fourth lens units on an optical axis, and at least one of the first, second, third, and fourth lens units has at least one diffractive optical surface.

Further purposes, features and advantages of the present invention will become apparent from the following description of the preferred embodiments with reference to the attached drawings.

BRIEF DESCRIPTION OF THE DRAWINGS

FIG. 4 is a schematic sectional view of a zoom lens of a numerical example 2 of the present invention;

FIGS. 5A–5D are graphical representations of the aberrations of the zoom lens of the numerical example 2 of the present invention at a wide angle end;

FIGS. 6A–6D are graphical representations of the aberrations of the zoom lens of the numerical example 2 of the present invention at a telephoto end;

FIG. 7 is a schematic sectional view of a zoom lens of a numerical example 3 of the present invention;

FIGS. 8A–8D are graphical representations of the aberrations of the zoom lens of the numerical example 3 of the present invention at a wide angle end;

FIGS. 9A–9D are graphical representations of the aberrations of the zoom lens of the numerical example 3 of the present invention at a telephoto end;

FIG. 10 is a schematic sectional view of a zoom lens of a reference example having no diffractive optical element;

FIGS. 11A–11D are graphical representations of the aberrations of the zoom lens of the reference example at a wide angle end;

FIGS. 12A–12D are graphical representations of the aberrations of the zoom lens of the reference example at a telephoto end;

DESCRIPTION OF THE PREFERRED EMBODIMENTS

An embodiment of a zoom lens and optical equipment of the present invention will be described blow using the drawings.

Figure 1A:
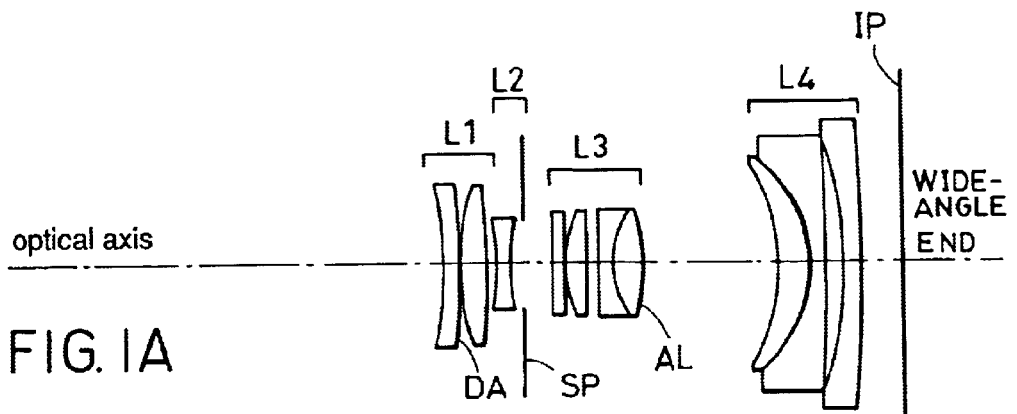
FIGS. 1A, 1B, and 1C are sectional schematic views of a zoom lens of a numerical example 1 of an embodiment of the present invention.
Figure 1B:
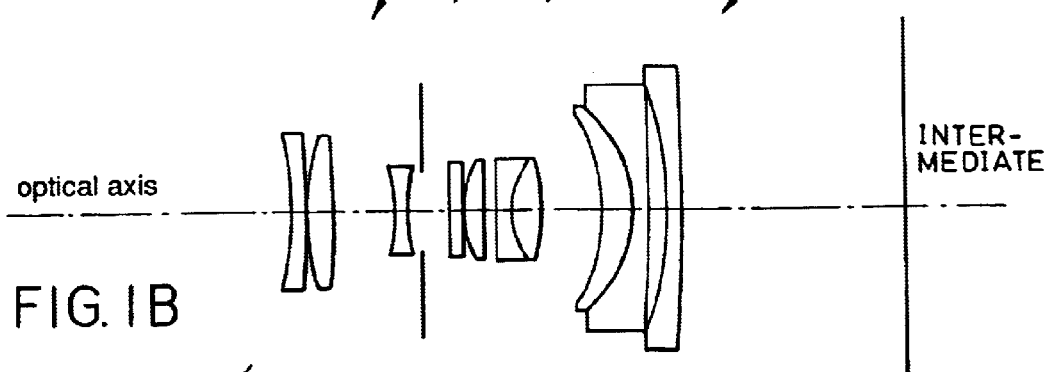
Figure 1C:
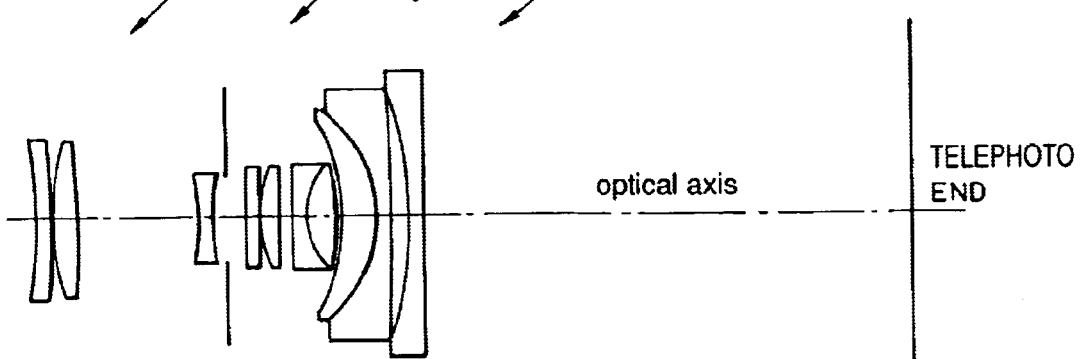
Figure 2A:
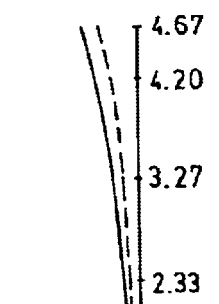
FIGS. 2A–2D are graphical representations of the aberrations of the zoom lens of the numerical example 1 of the present invention at a wide angle end.
Figure 2B:
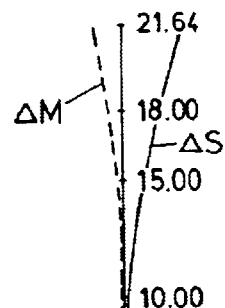
Figure 2C:
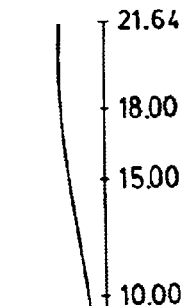
Figure 2D:
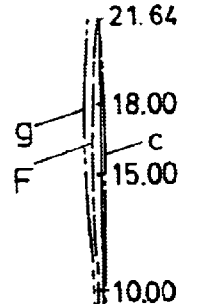
Figure 3A:
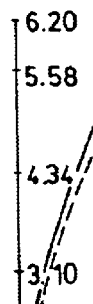
FIGS. 3A–3D are graphical representations of the aberrations of the zoom lens of the numerical example 1 of the present invention at a telephoto end.
Figure 3B:
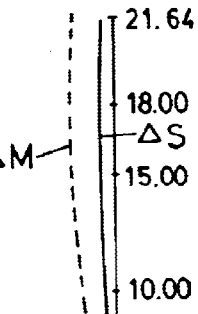
Figure 3C:
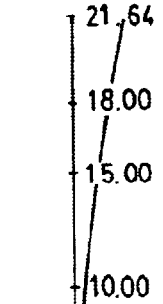
Figure 3D:
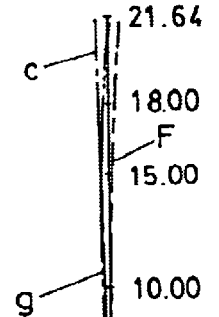

FIGS. 1A, 1B, and 1C are schematic sectional views of a zoom lens of a numerical example 1 of the present invention, and FIGS. 2A–2D and 3A–3D are graphical representations of the aberration the zoom lens of the numerical example 1 of the present invention at a wide angle end and a telephoto end, respectively. FIG. 4 is a schematic sectional view of a zoom lens of a numerical example 2 of the present invention, and FIGS. 5A–5D and 6A–6D are graphical representations of the aberrations of the zoom lens of the numerical example 2 of the present invention at a wide angle end and a telephoto end, respectively. FIG. 7 is a schematic sectional view of a zoom lens of a numerical example 3 of the present invention, and FIGS. 8A–8D and 9A–9D are graphical representations of the aberrations of the zoom lens of the numerical example 3 of the present invention at a wide angle end and a telephoto end, respectively.

In the sectional views of the respective numerical examples shown in FIGS. 1A, 1B, 1C, 4, and 7, reference symbol L1 denotes a first lens unit having a positive optical power (a reciprocal number of the focal length), reference symbol L2 denotes a second lens unit having a negative optical power, reference symbol L3 denotes a third lens unit having a positive optical power, and reference symbol L4 denotes a fourth lens unit having a negative optical power. The arrows in FIGS. 1A, 1B, and 1C show the moving directions of the respective lens units when zooming is performed from a wide angle end to a telephoto end. In FIGS. 4 and 7, the respective lens units move in zooming similarly as in FIGS. 1A, 1B, and 1C, while not being shown. Reference symbol SP denotes a diaphragm for determining the brightness of the optical system (numerical aperture), and similarly IP denotes an image surface on which a silver halide film or a photoelectric conversion element such as a CCD, MOS and the like is disposed.

Reference symbol DA denotes a diffractive optical surface (diffractive optical element) on which concentric circular phase gratings, which have rotation symmetry with respect to an optical axis, are formed. Reference symbol AL denotes an aspherical surface which is rotation symmetrical with respect to the optical axis.

The embodiment executes zooming from the wide angle end to the telephoto end by moving the respective lens units to the object side. With this construction, the size of the entire lens system is reduced while effectively achieving a desired variable power ratio.

In particular, the first and fourth lens units bear a relatively large share of zooming operation by greatly moving along the optical axis during zooming.

Further, in the respective numerical examples of the embodiment, at least one diffractive optical element is disposed on at least one lens unit of the four lens units, and the phase of the diffractive optical surface is properly set. With this construction, chromatic aberration, which is caused in the lens units to which the diffractive optical elements are disposed, is reduced so as to favorably correct the chromatic aberration over an entire variable power region.

As a specific lens construction of the zoom lens of the embodiment, the first lens unit is composed of two lenses, that is, one negative lens and one positive lens so that the first lens unit has a positive optical power as a whole. Further, the second lens unit is composed of a single negative lens. The third lens unit is composed of four lenses, that is, two lenses having a positive power, one negative lens, and one positive lens, or four lenses, that is, one negative lens, one positive lens, one negative lens, and one positive lens. In the third lens unit, the two lenses, that is, the negative lens and the positive lens on an image side are arranged as a bonded lens. The fourth lens unit is composed of a meniscus-shaped positive lens having a concave surface facing an image surface and a positive power and two negative lenses. Then, chromatic aberration is favorably corrected over the entire variable power range by disposing at least one diffractive optical element on any one of the first to fourth lens units.

In this embodiment, a phase shape $\phi$ of a diffractive optical surface (diffraction surface) is defined by the following formula.

$$\phi(h,m) = (2\pi/m\lambda_0)(C_1 h^2 + C_2 h^4 + C_3 h^6 \ldots) \ldots \quad (a)$$

where h denotes a vertical height with respect to the optical axis, m denotes the diffraction order of diffraction light, $\lambda_0$ denotes a design wavelength (that is, the wavelength at which the diffraction surface exhibits the highest diffraction efficiency), and Ci denotes a phase coefficient (i=1, 2, 3, ...).

Further, an optical power $\phi D$ obtained by a diffractive action with respect to an optional or arbitrary wavelength $\lambda$ and an optional or arbitrary diffraction order m is defined as follows using a lowest order of the phase coefficient $C_1$.

$$\phi D(\lambda, m) = -2C_1 m/\lambda_0$$

In the embodiment, the diffraction order m of diffraction light is 1, and the design wavelength $\lambda_0$ is the wavelength of a d-line (587.6 nm).

In general, an Abbe number vd (dispersion value) of a material of a refractive optical system is determined by the following formula when the optical powers at the respective wavelengths of the d-, C-, and F-lines of Fraunhofer lines are denoted by Nd, NC, and NF, respectively.

$$vd = (Nd-1)/(NF-NC) > 0$$

Whereas, an Abbe number (dispersion value) vDd of a diffractive optical element is determined by the following formula when respective wavelengths of the d-, C-, and F-lines are denoted by $\lambda d$, $\lambda C$, and $\lambda F$, respectively.

$$vDd = \lambda d/(\lambda F - \lambda C)$$

In the above formula, the substitution of $\lambda d$, $\lambda F$, and $\lambda C$ for 587.6, nm, 486.1 nm, and 656.3 nm results in vDd=−3.45. Thus, the Abbe number of the diffractive optical surface at an optional or arbitrary wavelength has a sign inverse to that of the refractive optical system, from which it can be found that the diffractive optical surface has an inverse dispersing property.

That is, an ordinary glass has the Abbe number v of about 20 to 95, whereas the diffractive optical element has the Abbe number of v=−3.453. Further, a partial dispersion ratio of the diffractive optical element has a value which is greatly different from that of the ordinary glass.

This embodiment effectively corrects chromatic aberration using the characteristics of the diffractive optical element described above.

FIG. 10 is a sectional view of a 4-unit zoom lens of a type similar to the zoom lens of the present invention. Reference symbols used in FIG. 10 that are the same as in FIG. 1 denote the same elements. The zoom lens has no diffractive optical surface and is prepared to compare with the zoom lens of the present invention.

FIGS. 11A–11D and 12A–12D are graphical representations of the aberrations of the zoom lens shown in FIG. 10 at a wide angle end and a telephoto end.

As shown in FIGS. 11A–11D and 12A–11D, when zooming is executed, a large amount of lateral chromatic aberration is caused by secondary dispersion in the zoom lens having no diffractive optical surface at the telephoto end as compared with the zoom lens of the present invention.

As described above, according to the embodiment, the compact zoom lens, which can favorably correct the variation of chromatic aberration caused by zooming and has excellent optical performance over the entire variable power range, can be realized by properly constructing the lenses of the respective lens units and properly setting the diffractive optical surfaces disposed on the lens units in the zoom lens having the four lens units as a whole.

It should be noted that it is preferable to satisfy at least one of the following conditions in the zoom lens of the present invention in order to favorably correct aberration while securing a higher variable power ratio.

(A-1) To dispose the diffractive optical surface on the first lens unit and/or the fourth lens unit.

The disposition of the diffractive optical surface on the first lens unit and/or the fourth lens unit and the application of the proper shape to the diffractive optical surface permit the lateral chromatic aberration, which is greatly varied by zooming, to be effectively corrected.

Further, pupil-paraxial light that reaches the vicinity of a frame is incident on the first and fourth lens units at a position relatively far from the optical axis in the radial direction. As a result, when the diffractive optical surface is disposed on the first and fourth lens units and the proper shape is applied to the diffractive optical surface, a so-called aspherical effect achieved by the diffractive optical element can be positively utilized, whereby aberration can be favorably corrected for each image height in the wide variable power range.

At this time, the diffractive optical surface may be disposed on both the first and fourth lens units, which can easily correct chromatic aberration more favorably.

(A-2) To satisfy the condition of the following formula (1) when an optical power obtained by the diffractive action of the diffractive optical surface of an i-th lens unit is denoted by $\phi Di$, and the overall optical power including the diffractive optical surface of the i-th lens unit is denoted by $\phi Li$.

$$\phi Di/\phi Li > 0 \quad (1)$$

The condition formula (1) is used to more effectively correct lateral chromatic aberration.

The condition formula (1) shows that the optical power obtained by the diffractive action of the diffractive optical surface has a value the sign of which is the same as that of the optical power of the i-th lens unit to which the diffractive optical surface is disposed.

That is, the application of the optical power having the same sign as that of a refractive optical system to the diffractive optical surface having a dispersion property inverse to that of the refractive optical system corrects chromatic aberration of the first or fourth lens unit, which is greatly multiplied by zooming, in each lens unit. Therefore, it is possible to favorably correct lateral chromatic aberration over the entire variable power region from a wide angle end to a telephoto end.

(A-3) To construct the diffractive optical surface from laminated materials having different refractive indices.

Ordinarily, the diffraction efficiency of a diffraction grating at a design order, that is, the order at which light of a particular wavelength is concentrated by the diffraction grating, (for example, the first order) tends to decrease as the wavelengths of light striking the diffraction grating stray from an optimized wavelength of light (that is, a design wavelength at which the diffraction surface exhibits the highest diffraction efficiency), whereas diffraction efficiency of diffraction light of zeroth and secondary orders, which are other than the design order but are particularly near thereto, tend to increase.

The increase in the diffraction efficiency of the diffraction light in the orders other than the designated order occurs because when the diffraction light reaches an image surface, it flares, which reduces the resolution of the optical system. In contrast, the diffraction efficiency can be maintained at the designated order in a larger wavelength region by arranging the diffraction surface, which is formed of different optical materials having different refractive indices, as a laminated structure.

In the zoom lens of the present invention, the best quality image can be obtained by applying the diffractive optical surface having the laminated structure.

Further, it is possible not to form a grating shape on the surface of the diffractive optical surface in this case. As a result, a less expensive optical system, having excellent dustproof characteristics and improved workability in the assembly of the diffractive optical surface, can be obtained.

Note that the diffractive optical element used in the zoom lens of the present invention may be provided with the effect of an aspherical surface by changing the pitch thereof. The zoom lens of the embodiment obtains excellent optical performance by particularly optimizing the higher order term of the phase of the diffractive optical element.

The diffractive optical element according to the present invention may be made of binary optics, which is an optical element made in a binary form using lithography as a method of manufacturing a holographic optical element. Further, the diffractive optical element may be made using a mold made by the above method. Further, the diffractive optical element may be made by a method of transferring a film of plastic or the like onto an optical surface as the above diffractive optical surface.

Figure 13:
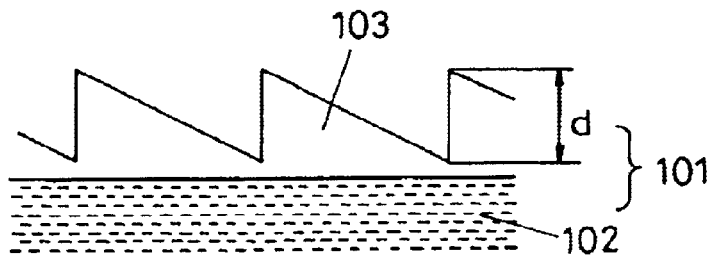
FIG. 13 is a schematic view explaining a diffractive optical element of the embodiment.
Figure 14:
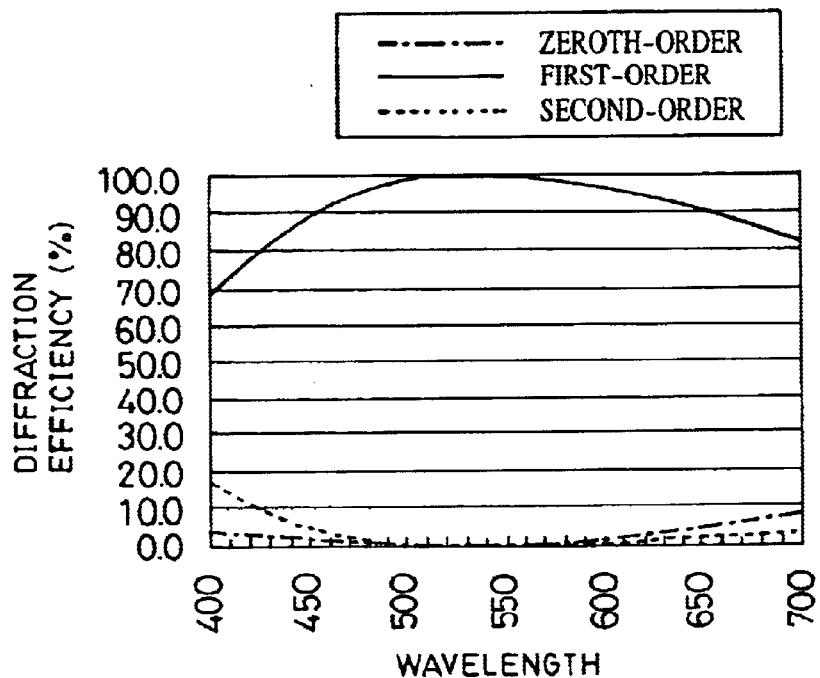
FIG. 14 is a graph explaining a wavelength dependent characteristics of the diffractive optical element shown in FIG. 13.

A kinoform as shown, for example, in FIG. 13 is applicable as the shape of the diffraction grating of the diffractive optical element. FIG. 14 shows wavelength dependent characteristics of the first order diffraction efficiency of the diffractive optical element shown in FIG. 13. An actual diffraction grating is constructed such that an ultraviolet curing resin is coated on the surface of a substrate 102, and a grating 103 having a thickness d, which produces a first order diffraction efficiency of 100%, is formed on a resin portion for diffracting light of a wavelength of 530 nm.

As is apparent from FIG. 14, the diffraction efficiency at the design order is reduced away from the optimized wavelength of 530 nm, whereas the diffraction efficiency of the diffraction light is increased in the zeroth and second orders which are in the vicinity of the design order. When the diffraction efficiency of the diffraction light increases in orders other than the design order, the diffraction light is made to flare, which reduces the resolution of the optical system.

Figure 15:
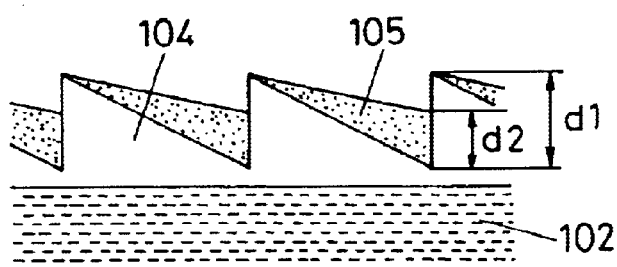
FIG. 15 is a schematic view explaining a laminated-type diffractive optical element.

To cope with this problem, the laminated type diffraction grating shown in FIG. 15 may be used as the grating shape of the diffractive optical element of the embodiment of the present invention.

Figure 16:
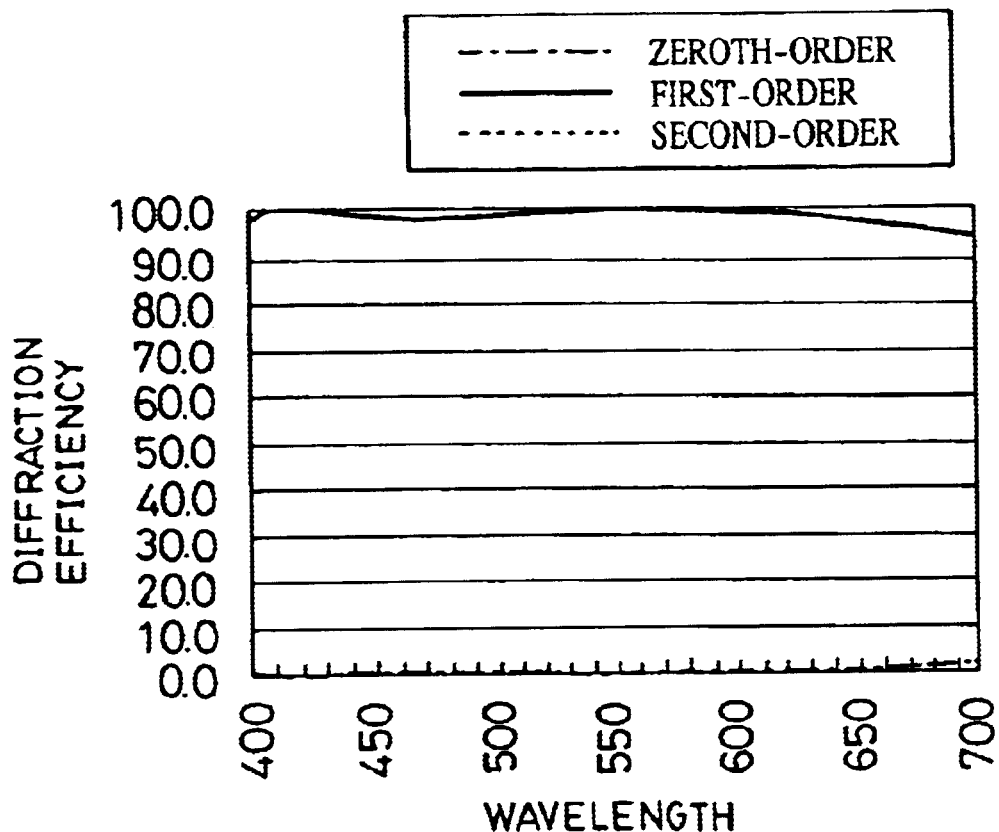
FIG. 16 is a graph explaining wavelength dependent characteristics of the diffractive optical element shown in FIG. 15.

FIG. 16 shows wavelength dependent characteristics of the first order diffraction efficiency of the diffractive optical element constructed as described above. As a specific construction, a first diffraction grating 104 composed of an ultraviolet curing resin (nd=1.499, vd=54) is formed on a substrate 102, and a second diffraction grating 105 composed of another ultraviolet curing resin (nd=1.598, vd=28) is formed on the first diffraction grating 104. In this combination of the materials, the grating thickness d1 of the first diffraction grating is set to d1=13.8 $\mu$m, and the grating thickness d2 of the second diffraction grating is set to d2=10.5 $\mu$m.

As can be seen from FIG. 16, the diffraction efficiency of the design order has a high diffraction efficiency of at least 95% over the entire wavelength region being used by constructing the diffraction grating as a laminated structure.

The optical performance can be further improved by using the diffraction grating of the laminated structure as the diffractive optical element to be used in the zoom lens of the embodiment as described above.

It should be noted that the material of the diffractive optical element having the laminated structure is not limited to an ultraviolet curing resin, and other plastic material and the like may be used. Further, the first diffraction grating 104 may be directly formed on the substrate depending upon the substrate.

Figure 17:
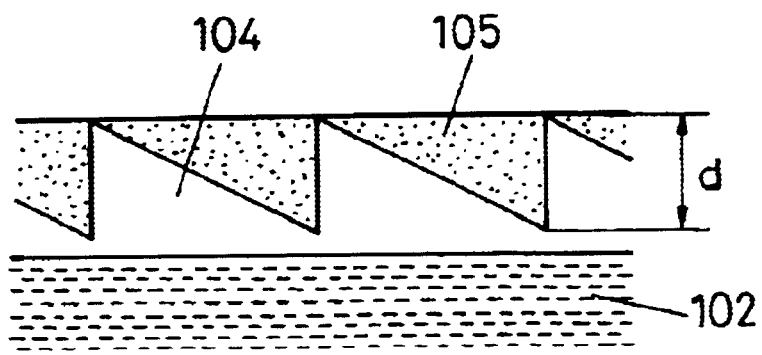
FIG. 17 is a schematic view explaining a laminated-type diffractive optical element the thicknesses of the gratings of which are made equal to each other.

Further, the respective gratings need not have a different thickness, and it is possible for the two gratings to have the same thickness as shown in FIG. 17 depending upon the combination of materials used. In this embodiment, the first diffraction grating 104 and the second diffraction grating 105, formed on the substrate 102, have the same thickness. Since no grating shape is formed on the surface of the diffractive optical surface in this case, a less expensive optical system, having excellent dustproof characteristics and improved workability in the assembly of the diffractive optical surface, can be provided.

Next, an embodiment of a lens shutter camera (optical equipment) using the zoom lens of the present invention as an imaging optical system will be explained using FIG. 18.

Figure 18:
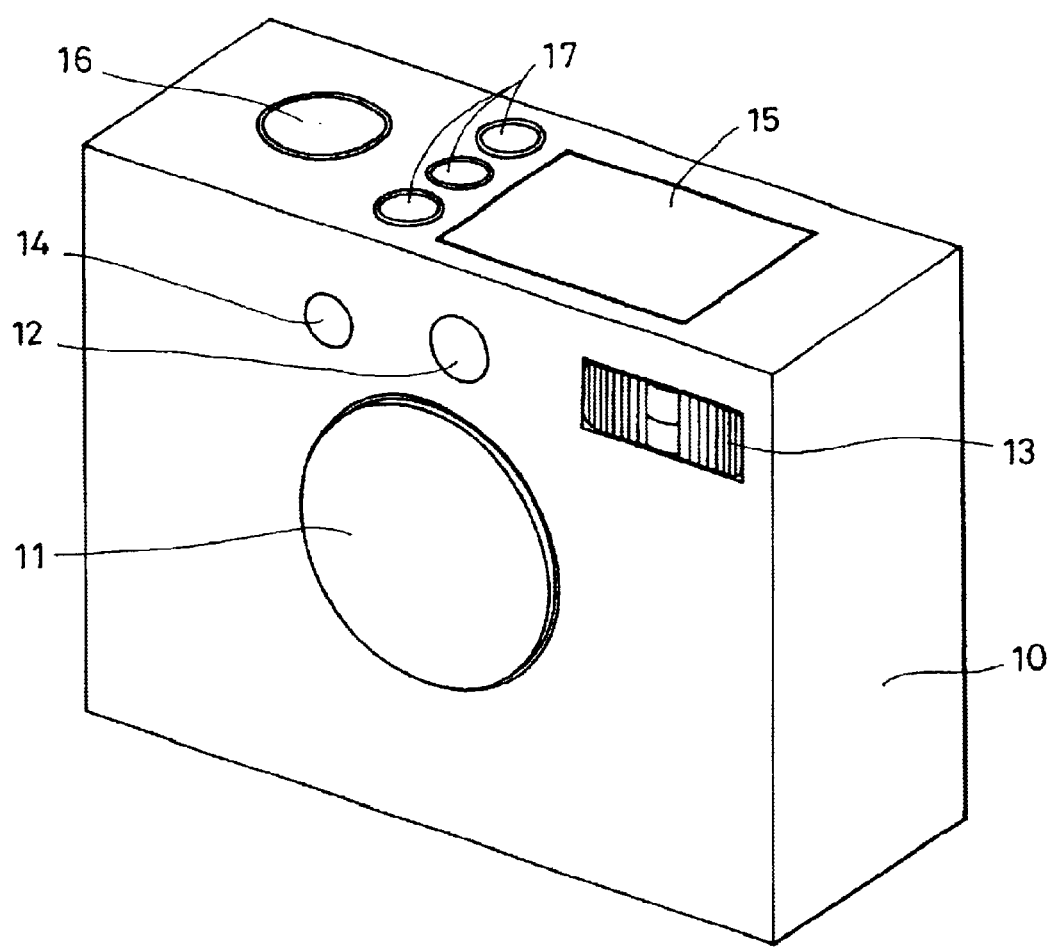
FIG. 18 is a schematic view of the main portion of optical equipment (camera) using the zoom lens of the present invention.

In FIG. 18, reference numeral 10 denotes a camera main body, reference numeral 11 denotes an imaging optical system composed of the zoom lens of the present invention, and reference numeral 12 denotes a finder for observing an object image.

Reference numeral 13 denotes an electronic flash, reference numeral 14 denotes a measuring window, reference numeral 15 denotes a liquid crystal display window for notifying the operator of the operations of the camera, reference numeral 16 denotes a release button, and reference numeral 17 denotes an operation switch for switching various modes.

Next, data of the above-mentioned numerical examples 1 to 3 will be shown.

In the numerical examples, reference symbol ri denotes a radius of curvature of an i-th surface in sequence from an object, reference symbol di denotes an interval between an i-th surface and an (i+1)-th surface in sequence from the object, reference numerals ni and vi denote a refractive index and an Abbe number of an i-th optical material in sequence from the object, respectively, f denotes the focal length, Fno denotes the F number, B, C, and D denote aspherical surface coefficient, C1–C4 denote phase coefficients, $\phi$Di denotes the optical power obtained by the diffractive action of the diffractive optical surface of an i-th lens unit, and $\phi$Li denotes the overall optical power of the i-th lens unit including the diffractive optical surface.

Further, the aspherical surface of the embodiment is a rotation symmetrical aspherical surface. When the reference radius of curvature of an aspherical surface of a lens is denoted by r, the distance from the optical axis of the lens in a radial direction is denoted by h, and k, B, C, D and E denote coefficients relating to the phase profile of the aspherical surface, a coordinate Z (h) of the aspherical surface in an optical axis direction is determined by the following formula.

$$Z(h) = \frac{h^2/r}{1+\sqrt{1-(1+k)\frac{h^2}{r^2}}} + Bh^4 + Ch^6 + Dh^8 + Eh^{10} + \ldots$$

The coefficients of the above formula (a) are written in a phase equation showing the surface of a diffractive optical element. At that time, the design diffraction order is a first order and a design wavelength is a d-line.

"d–n" in an aspherical surface coefficient and a phase coefficient show "$\times 10^{-n}$".

In the graphs shown in FIGS. 2A–2D, 3A–3D, 4A–5D, 6A–6D, 8A–8D, 9A–9D, 11A–11D, 12A–12D illustrating the aberrations of numerical examples 1–3, ω denotes half the image angle, ΔM denotes the meridional image surface for the d-line, ΔS denotes the sagittal image surface for the d-line, g denotes the spectral g-line, F denotes the spectral F-line, and c denotes the spectral c-line.

Numerical example 1
f = 36.04 to 59.97 to 101.79    Fno = 3.87 to 5.73 to 8.28

|  |  |  |  |  |  |  |  |  |  |
|---|---|---|---|---|---|---|---|---|---|
| *D | r1 = | −51.370 | d1 = | 1.60 | n1 = | 1.805 | v1 = | 25.43 |
|  | r2 = | −149.550 | d2 = | 0.15 |  |  |  |  |
|  | r3 = | 26.859 | d3 = | 2.87 | n2 = | 1.603 | v2 = | 60.70 |
|  | r4 = | −123.470 | d4 = | 1.36 to 7.10 to 13.82 |  |  |  |  |
|  | r5 = | −23.159 | d5 = | 1.50 | n3 = | 1.487 | v3 = | 70.21 |
|  | r6 = | 26.804 | d6 = | 1.60 |  |  |  |  |
|  | r7 = | (diaphragm) | d7 = | 3.20 to 2.99 to 2.04 |  |  |  |  |
|  | r8 = | 412.166 | d8 = | 1.50 | n4 = | 1.487 | v4 = | 70.21 |
|  | r9 = | −353.978 | d9 = | 0.15 |  |  |  |  |
|  | r10 = | 14.998 | d10 = | 2.24 | n5 = | 1.805 | v5 = | 25.43 |
|  | r11 = | −144.271 | d11 = | 1.46 |  |  |  |  |
|  | r12 = | −205.366 | d12 = | 1.50 | n6 = | 1.805 | v6 = | 25.43 |
|  | r13 = | 8.463 | d13 = | 3.36 | n7 = | 1.583 | v7 = | 59.38 |
| *AL | r14 = | −27.168 | d14 = | 15.61 to 7.11 to 0.80 |  |  |  |  |
|  | r15 = | −23.290 | d15 = | 3.58 | n8 = | 1.847 | v8 = | 23.78 |
|  | r16 = | −15.101 | d16 = | 0.15 |  |  |  |  |
|  | r17 = | −15.644 | d17 = | 1.80 | n9 = | 1.697 | v9 = | 55.53 |
|  | r18 = | −269.034 | d18 = | 1.95 |  |  |  |  |
|  | r19 = | −44.389 | d19 = | 1.80 | n10 = | 1.697 | v10 = | 55.53 |
|  | r20 = | −264.549 | d20 = |  |  |  |  |  |

Aspheric surface coefficient

B = 5.791 d-5
C = 1.525 d-7
D = −4.842 d-9

Phase coefficient

C1 = −2.110 d-5
C2 = −6.322 d-7
C3 = 2.292 d-9
C4 = −4.317 d-12
φDi/φLi = 0.00241

Numerical example 2
F = 36.03 to 59.95 to 101.73    Fno = 3.87 to 5.73 to 8.28

|  |  |  |  |  |  |  |  |
|---|---|---|---|---|---|---|---|
| r1 = | −70.174 | d1 = | 1.50 | n1 = | 1.805 | v1 = | 25.43 |
| r2 = | −78.108 | d2 = | 0.15 |  |  |  |  |
| r3 = | 24.929 | d3 = | 2.89 | n2 = | 1.603 | v2 = | 60.70 |
| r4 = | −173.767 | d4 = | 1.39 to 7.10 to 13.77 |  |  |  |  |
| r5 = | −22.824 | d5 = | 1.50 | n3 = | 1.487 | v3 = | 70.21 |
| r6 = | 29.767 | d6 = | 1.55 |  |  |  |  |
| r7 = | (diaphragm) | d7 = | 3.20 to 2.84 to 2.07 |  |  |  |  |
| r8 = | 352.020 | d8 = | 1.50 | n4 = | 1.487 | v4 = | 70.21 |
| r9 = | −1059.287 | d9 = | 0.15 |  |  |  |  |
| r10 = | 15.268 | d10 = | 2.36 | n5 = | 1.805 | v5 = | 25.43 |
| r11 = | −157.216 | d11 = | 1.25 |  |  |  |  |

-continued

|  |  |  |  |  |  |  |  |  |
|---|---|---|---|---|---|---|---|---|
|  | r12 = | −394.900 | d12 = | 1.50 | n6 = | 1.805 | v6 = | 25.43 |
|  | r13 = | 8.529 | d13 = | 3.36 | n7 = | 1.583 | v7 = | 59.38 |
| *AL | r14 = | −27.215 | d14 = | 15.15 to 7.02 to 0.80 |  |  |  |  |
|  | r15 = | −21.972 | d15 = | 3.36 | n8 = | 1.847 | v8 = | 23.78 |
|  | r16 = | −15.101 | d16 = | 0.15 |  |  |  |  |
|  | r17 = | −16.045 | d17 = | 1.80 | n9 = | 1.697 | v9 = | 55.53 |
|  | r18 = | −236.917 | d18 = | 2.14 |  |  |  |  |
| *D | r19 = | −38.886 | d19 = | 1.80 | n10 = | 1.697 | v10 = | 55.53 |
|  | r20 = | −153.184 | d20 = |  |  |  |  |  |

Aspheric surface coefficient

B = 5.791 d-5
C = 1.525 d-7
D = −4.842 d-9

Phase coefficient

C1 = 1.233 d-4
C2 = 8.538 d-7
C3 = −1.123 d-8
C4 = 3.251 d-11
φDi/φLi = 0.00672

Numerical example 3
f = 39.14 to 60.00 to 106.70    Fno = 3.89 to 5.69 to 8.28

|  |  |  |  |  |  |  |  |  |
|---|---|---|---|---|---|---|---|---|
|  | r1 = | −224.379 | d1 = | 1.50 | n1 = | 1.805 | v1 = | 25.43 |
|  | r2 = | 128.901 | d2 = | 0.15 |  |  |  |  |
|  | r3 = | 20.888 | d3 = | 2.83 | n2 = | 1.603 | v2 = | 60.64 |
|  | r4 = | 221.666 | d4 = | 1.39 to 3.22 to 12.64 |  |  |  |  |
|  | r5 = | −38.442 | d5 = | 1.50 | n3 = | 1.487 | v3 = | 70.23 |
|  | r6 = | 65.285 | d6 = | 1.38 |  |  |  |  |
|  | r7 = | (diaphragm) | d7 = | 3.65 to 4.61 to 1.28 |  |  |  |  |
|  | r8 = | −24.879 | d8 = | 1.50 | n4 = | 1.487 | v4 = | 70.23 |
|  | r9 = | −71.521 | d9 = | 0.15 |  |  |  |  |
|  | r10 = | 18.484 | d10 = | 1.90 | n5 = | 1.805 | v5 = | 25.42 |
|  | r11 = | 123.039 | d11 = | 1.20 |  |  |  |  |
|  | r12 = | 38.208 | d12 = | 1.50 | n6 = | 1.805 | v6 = | 25.42 |
|  | r13 = | 10.158 | d13 = | 4.14 | n7 = | 1.564 | v7 = | 60.67 |
| *AL | r14 = | −32.564 | d14 = | 15.82 to 8.40 to 0.80 |  |  |  |  |
|  | r15 = | −17.897 | d15 = | 2.84 | n8 = | 18.05 | v8 = | 25.42 |
|  | r16 = | −15.296 | d16 = | 0.15 |  |  |  |  |
|  | r17 = | −17.195 | d17 = | 1.80 | n9 = | 1.589 | v9 = | 61.14 |
|  | r18 = | −97.849 | d18 = | 2.16 |  |  |  |  |
| *D | r19 = | −34.435 | d19 = | 1.80 | n10 = | 1.487 | v10 = | 70.23 |
|  | r20 = | 4738.693 | d20 = |  |  |  |  |  |

Aspheric surface coefficient

B = 5.347 d-5
C = 6.611 d-8
D = −7.341 d-10

Phase coefficient

C1 = 1.5935 d-4
C2 = −1.434 d-7
C3 = −4.869 d-9
C4 = 2.492 d-11
φDi/φLi = 0.00904

According to the embodiment explained above, there are provided the zoom lens and the optical equipment using the zoom lens, wherein the zoom lens can easily obtain a high variable power ratio and favorably correct lateral chromatic aberration varied by zooming and has an excellent optical performance over the entire variable power range by properly constructing the lenses of the respective lens units and properly setting the diffractive optical surfaces to be disposed on the lens units.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens, comprising in sequence from an object side to an image side:
   a first lens unit having a positive optical power;
   a second lens unit having a negative optical power;
   a third lens unit having a positive optical power; and
   a fourth lens unit having a negative optical power,
   wherein said first, second, third, and fourth lens units move to the object side along an optical axis in zooming from the wide angle end to the telephoto end,
   wherein said fourth lens unit has a diffractive optical surface located on an object side surface of an optical element of said fourth lens unit,
   wherein the lens units comprising the zoom lens are only said first, second, third, and fourth lens units, and
   wherein the shape of the surface closest to the image side in said fourth lens unit is convex to the image side.

2. A zoom lens according to claim 1, wherein said diffractive optical surface comprises concentric circular phase gratings that are rotationally symmetrical with respect to the optical axis of said zoom lens.

3. A zoom lens according to claim 1, wherein said fourth lens unit has a diffractive optical surface located on the object side of a lens closest to the image side of said fourth lens unit.

4. A zoom lens according to claim 1, wherein said first, second, third, and fourth lens units are individually denoted as the i-th lens unit, where i equals 1, 2, 3, or 4, wherein when the optical power obtained by the diffractive action of the diffractive optical surface of said i-th lens unit is denoted by $\phi Di$, and the optical power of the i-th lens unit is denoted by $\phi Li$, the condition $\phi Di/\phi Li > 0$ is satisfied.

5. A zoom lens according to claim 1, wherein said first lens unit comprises one positive lens element and one negative lens element.

6. A zoom lens according to claim 1, wherein said second lens unit comprises one negative lens element.

7. A zoom lens according to claim 1, wherein said third lens unit comprises at least two positive lens elements and at least one negative lens element.

8. A zoom lens according to claim 7, wherein said third lens unit comprises a bonded lens.

9. A zoom lens according to claim 1, wherein said fourth lens unit comprises one positive lens element and two negative lens elements.

10. A zoom lens according to claim 1, wherein said diffractive optical surface has a structure formed by laminating phase diffraction gratings composed of materials having different refractive indices.

11. A zoom lens according to claim 1, wherein said diffractive optical surface corrects lateral chromatic aberration.

12. Optical equipment, comprising:
    an optical-equipment element; and
    a zoom lens according to claim 1, said zoom lens being connected to said optical-equipment element.

13. A zoom lens according to claim 1, wherein said fourth lens unit has a diffractive optical surface.

14. A zoom lens according to claim 1, wherein said diffractive optical surface is provided with the effect of an aspherical surface by changing the pitch of said diffractive optical surface.

15. A zoom lens, comprising in sequence from an object side to an image side:
    a first lens unit having a positive optical power;
    a second lens unit having a negative optical power;
    a third lens unit having a positive optical power; and
    a fourth lens unit having a negative optical power,
    wherein said first, second, third, and fourth lens units move to the object side along an optical axis in zooming from the wide angle end to the telephoto end,
    said fourth lens unit has a diffractive optical surface located on an object side surface of an optical element of said fourth lens unit,
    wherein the lens units comprising the zoom lens are only said first, second, third, and fourth lens units, and
    wherein the only lenses of said first lens unit are a negative lens whose concave surface faces the object side and a positive lens in sequence from the object side to the image side.

16. A zoom lens according to claim 15, wherein said diffractive optical surface has a structure formed by laminating phase diffraction gratings composed of materials having different refractive indices.

17. A zoom lens, comprising in sequence from an object side to an image side:
    a first lens unit having a positive optical power;
    a second lens unit having a negative optical power;
    a third lens unit having a positive optical power; and
    a fourth lens unit having a negative optical power,
    wherein said first, second, third, and fourth lens units move to the object side along an optical axis in zooming from the wide angle end to the telephoto end,
    wherein said first lens unit has a diffractive optical surface located on a surface other than a lens surface closest to the object side of said first lens unit,
    wherein the lens units comprising the zoom lens are only said first, second, third, and fourth lens units, and
    wherein said second lens unit has only one lens element, which is a biconcave negative lens element.

18. A zoom lens according to claim 17, wherein the shape of the surface closest to the image side in said fourth lens unit is convex to the image side.

19. A zoom lens according to claim 17, wherein the only lenses of said first lens unit are a negative lens whose concave surface faces the object side and a positive lens in sequence from the object side to the image side.

20. A zoom lens according to claim 17, wherein the zoom lens further comprises an aperture stop, and said aperture stop moves with said second lens unit as a unit in zooming.

21. A zoom lens according to claim 17, wherein said first, second, third, and fourth lens units move to the object side along an optical axis so that the interval between said first lens unit and said fourth lens unit decreases, in zooming from the wide angle end to the telephoto end.

22. A zoom lens according to claim 17, wherein said fourth lens unit comprises a positive lens and two negative lenses.

23. A zoom lens according to claim 17, wherein said diffractive optical surface has a structure formed by laminating phase diffraction gratings composed of materials having different refractive indices.

24. A zoom lens, comprising in sequence from an object side to an image side:

a first lens unit having a positive optical power;
a second lens unit having a negative optical power;
a third lens unit having a positive optical power; and
a fourth lens unit having a negative optical power,
wherein said first, second, third, and fourth lens units move to the object side along an optical axis in zooming from the wide angle end to the telephoto end,
wherein said fourth lens unit has a diffractive optical surface located on an object side surface of an optical element of said fourth lens unit,
wherein the lens units comprising the zoom lens are only said first, second, third, and fourth lens units, and
wherein the zoom lens further comprises an aperture stop, and said aperture stop moves with said second lens unit as a unit in zooming.

25. A zoom lens according to claim 24, wherein said diffractive optical surface has a structure formed by laminating phase diffraction gratings composed of materials having different refractive indices.

26. A zoom lens, comprising in sequence from an object side to an image side:
a first lens unit having a positive optical power;
a second lens unit having a negative optical power;
a third lens unit having a positive optical power; and
a fourth lens unit having a negative optical power,
wherein said first, second, third, and fourth lens units move to the object side along an optical axis in zooming from the wide angle end to the telephoto end,
wherein said fourth lens unit has a diffractive optical surface located on an object side surface of an optical element of said fourth lens unit,
wherein the lens units comprising the zoom lens are only said first, second, third, and fourth lens units, and
wherein said second lens unit has only one lens element, which is a negative lens element.

27. A zoom lens according to claim 26, wherein said diffractive optical surface has a structure formed by laminating phase diffraction gratings composed of materials having different refractive indices.

28. A zoom lens, comprising in sequence from an object side to an image side:
a first lens unit having a positive optical power;
a second lens unit having a negative optical power;
a third lens unit having a positive optical power; and
a fourth lens unit having a negative optical power,
wherein said first, second, third, and fourth lens units move to the object side along an optical axis so that the interval between said first lens unit and said fourth lens unit decreases, in zooming from the wide angle end to the telephoto end,
wherein said fourth lens unit has a diffractive optical surface located on an object side surface of an optical element of said fourth lens unit,
wherein the lens units comprising the zoom lens are only said first, second, third, and fourth lens units, and
wherein said fourth lens unit comprises three lenses.

29. A zoom lens according to claim 28, wherein said diffractive optical surface has a structure formed by laminating phase diffraction gratings composed of materials having different refractive indices.

30. A zoom lens, comprising in sequence from an object side to an image side:
a first lens unit having a positive optical power;
a second lens unit having a negative optical power;
a third lens unit having a positive optical power; and
a fourth lens unit having a negative optical power,
wherein said first, second, third, and fourth lens units move to the object side along an optical axis in zooming from the wide angle end to the telephoto end,
wherein said fourth lens unit has a diffractive optical surface located on an object side surface of an optical element of said fourth lens unit,
wherein the lens units comprising the zoom lens are only said first, second, third, and fourth lens units, and
wherein said fourth lens unit comprises a positive lens and two negative lenses.

31. A zoom lens according to claim 30, wherein said diffractive optical surface has a structure formed by laminating phase diffraction gratings composed of materials having different refractive indices.

* * * * *

UNITED STATES PATENT AND TRADEMARK OFFICE
CERTIFICATE OF CORRECTION

PATENT NO. : 6,757,103 B2 Page 1 of 1
DATED : June 29, 2004
INVENTOR(S) : Takashi Shirasuna It is certified that error appears in the above-identified patent and that said Letters Patent is hereby corrected as shown below:

Title page,
Item [30], Foreign Application Priority Data,
"2000/119739" should read -- 2000-119739 --.

Column 3,
Line 49, "and" should be deleted.
Line 64, "blow" should read -- below --.

Column 5,
Line 12, "$C^3$" should read -- $C_3$ --.
Line 24, "$/\lambda_0$" should read -- $\lambda/\lambda_0$ --.
Line 28, "vd" should read -- νd --.
Line 66, "12A-11D" should read -- 12A-12D --.

Column 8,
Line 51, "vi" should read -- νi --.

Column 10,
Line 36, "n8=18.05" should read -- n8=1.805 --.

Column 12,
Line 12, "said fourth lens unit" should read -- wherein said fourth lens unit --.

Signed and Sealed this

Fourteenth Day of December, 2004

JON W. DUDAS
*Director of the United States Patent and Trademark Office*